(12) United States Patent
Drees

(10) Patent No.: US 6,430,985 B1
(45) Date of Patent: Aug. 13, 2002

(54) MULTIPLE POINT CALIBRATED HVAC FLOW RATE CONTROLLER

(75) Inventor: Kirk H Drees, Cedarberg, WI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/368,971

(22) Filed: Aug. 5, 1999

(51) Int. Cl.[7] .............................................. G01F 25/00
(52) U.S. Cl. ...................................... 73/1.34; 702/100
(58) Field of Search ................................ 73/1.34, 1.35; 702/100

(56) References Cited

U.S. PATENT DOCUMENTS

| | | | | |
|---|---|---|---|---|
| 4,264,961 A | * | 4/1981 | Nishimura | 73/204 X |
| 4,821,557 A | * | 4/1989 | Beeson, III | |
| 4,829,449 A | * | 5/1989 | Polesnak | 73/861.03 X |
| 5,446,677 A | | 8/1995 | Jensen et al. | 700/277 |
| 5,479,812 A | | 1/1996 | Juntunen et al. | 73/1.34 |
| 5,705,734 A | * | 1/1998 | Ahmed | 454/256 X |
| 5,710,370 A | * | 1/1998 | Shanahan et al. | 73/1.35 |
| 5,768,121 A | | 6/1998 | Federspiel | 700/28 |

FOREIGN PATENT DOCUMENTS

| | | | | |
|---|---|---|---|---|
| CA | 1301332 | * | 5/1992 | G01F/25/00 |
| JP | 60-186728 | * | 9/1985 | 73/1.6 |
| JP | 1-301124 | * | 12/1989 | 73/198 |

OTHER PUBLICATIONS

Derwent abstract of SU 530189 A, Assignee Kurshin Accino 1977–G6338Y "Nozzles flow rate coeffect measurement metal uses calibrated vessel, temperature and pressure gouges, and control valve" Mar 1997.*
Derwent abstract clipped images of RO 106801 B1, inventor Sarba, Acc: No. 1994–277360 Measuring flow coefficient of flow meter using fluid circuit and electromagnetic flow meter which measures flow and differential pressure, Jun. 1993.*

* cited by examiner

Primary Examiner—Thomas P. Noland
(74) Attorney, Agent, or Firm—Foley & Lardner

(57) ABSTRACT

A pressure sensor often is employed to provide an indication of a pressure differential that results from air flowing through an HVAC system. An apparatus processes the pressure differential indication to derive a measurement of the air flow rate. Greater measurement accuracy is achieved by calibrating the apparatus at both the minimum and maximum flow rates expected in the system. This is accomplished by deriving separate gain factor coefficients for the performance of the sensing at both the minimum and maximum flow rates. The use of these coefficients also eliminates the dependency of the flow rate calculation on the density of the fluid and the cross-sectional area of the fluid conduit.

20 Claims, 2 Drawing Sheets

MULTIPLE POINT CALIBRATED HVAC FLOW RATE CONTROLLER

BACKGROUND OF THE INVENTION

The present invention relates to control systems for heating, ventilating and air conditioning (HVAC) systems, and in particular to calibrated sensing of air flow in such systems.

Heating, ventilating and air conditioning (HVAC) systems are designed and installed to maintain environmental conditions within buildings for the comfort of the occupants. A typical installation divides the building into zones and the HVAC system is adapted to maintain each zone within predefined environmental parameters (e.g., temperature, humidity, outdoor/recirculated air ratio, etc.). An air handling unit (A.U.) supplies conditioned air to ductwork that distributes the air to each of the zones. The air handling unit generally includes elements for introducing outdoor air into the system and for exhausting air from the system. Other elements heat, cool, filter and otherwise condition the air which circulates through air distribution ducts at a desired flow rate.

Air flow from the air handling unit to different regions of the zone is regulated by a separate variable air volume (VAV) terminal unit, also called a VAV box. The typical variable air volume terminal unit has a damper driven by an actuator to vary the flow of air from the air distribution duct into the associated zone region. Variable air volume terminal units serving zones on exterior walls typically have a heating element to increase the temperature of the air that flows in to the associated room. The these components are operated by a controller in response to signals from devices that sense air temperature and flow rate.

The air flow rate commonly is measured using a pitot tube which produces a differential pressure signal that is related in a non-linear manner to the flow rate. The VAV box controller calculates the air flow rate from the differential pressure signal. The determination of the flow rate often is simplified by assuming that air is incompressible, thereby allowing equation (1) to be derived from the well known Bernoulli equation;

$$\dot{\omega} = C \cdot A \cdot \sqrt{\Delta P} \quad (1)$$

where $\dot{\omega}$ is the flow rate, C is a coefficient related primarily to the fluid density, A is the cross-sectional area where the flow rate is measured, and $\Delta P$ is the differential pressure measured across the orifice or the velocity pressure measured by a pitot tube.

Because the value of the pressure differential $\Delta P$ is very small and difficult to measure at very low flow rates, the pressure differential often is amplified by sensing the static pressure in a low pressure region immediately behind the orifice. In this case the flow rate is commonly calculated by the expression:

$$\dot{\omega} = C \cdot A \cdot \sqrt{\frac{\Delta P}{k}} \quad (2)$$

where k is a gain factor equal to the ratio of the measured differential pressure to the actual differential pressure between the flow streams immediately before and after the orifice. In current air flow balancing practices, the value of k is assumed to be constant throughout the operating range. The value of k is determined for each VAV terminal unit in an HVAC system based on empirical measurement of the actual flow rate with a calibrated sensor. The derivation of k typically is performed at the minimum flow rate for the VAV terminal unit and then inputted into the unit's controller as a value to use in solving equation (2). However, because the relationship of the pressure differential to air flow does not exactly match equation 2, this process does not calibrate the VAV terminal unit at other flow rates.

SUMMARY OF THE INVENTION

An apparatus for measuring an unknown flow rate of a fluid can be calibrated at two flow rates, for example the minimum and maximum flow rates expected for the fluid. This dual calibration provides greater accuracy subsequently when measuring an unknown flow rate.

The calibration is performed by causing the fluid to flow at a first rate past a flow sensor, such as a pitot tube, of the apparatus. At that time, a first pressure reading across the flow sensor is obtained. In the preferred embodiment the pressure sensor reading indicates a differential pressure. A flow rate meter is used to measure the flow of fluid, thereby producing a relatively accurate first flow rate measurement.

Then the fluid is caused to flow past the flow sensor at a second rate while a second pressure reading across the flow sensor is obtained. At this time, the flow rate meter is used to measure the flow of fluid, thereby producing a relatively accurate second flow rate measurement.

The first pressure reading, the second pressure reading, the first flow rate measurement and the second flow rate measurement are used to calculate a first gain factor coefficient $a_0$ and a second gain factor coefficient $a_1$.

Thereafter, the first and second flow rate measurements are employed to measure an unknown flow rate of the fluid based on a reading P from the pressure sensor. For example the unknown flow rate $\dot{\omega}$ using the expression:

$$\dot{\omega} = Z \cdot \sqrt{\frac{P}{a_0 + a_1 * P}}$$

where Z has a predefined value. For example, depending upon the derivation of the first and second gain factor coefficients $a_0$ and $a_1$, Z may have a value of one or be equal to the product of a coefficient of fluid density and the cross-sectional area of a conduit through which the fluid is flowing.

In the preferred versions of the calibration technique, the second gain factor coefficient $a_1$ is calculated according to the expression:

$$a_1 = \frac{Z^2}{(P_2 - P_1)} \cdot \left( \frac{P_2}{\dot{\omega}_2^2} - \frac{P_1}{\dot{\omega}_2^2} \right)$$

where $P_1$ is the first pressure reading, $P_2$ is the second pressure reading, $\dot{\omega}_1$ is the first flow rate measurement, and $\dot{\omega}_2$ is the second flow rate measurement. The first gain factor coefficient $a_0$ is calculated according to the expression:

$$a_0 = P_1 \cdot \left[ \left( \frac{Z}{\dot{\omega}_1} \right)^2 - a_1 \right]$$

DETAILED DESCRIPTION OF THE INVENTION

Figure 1:
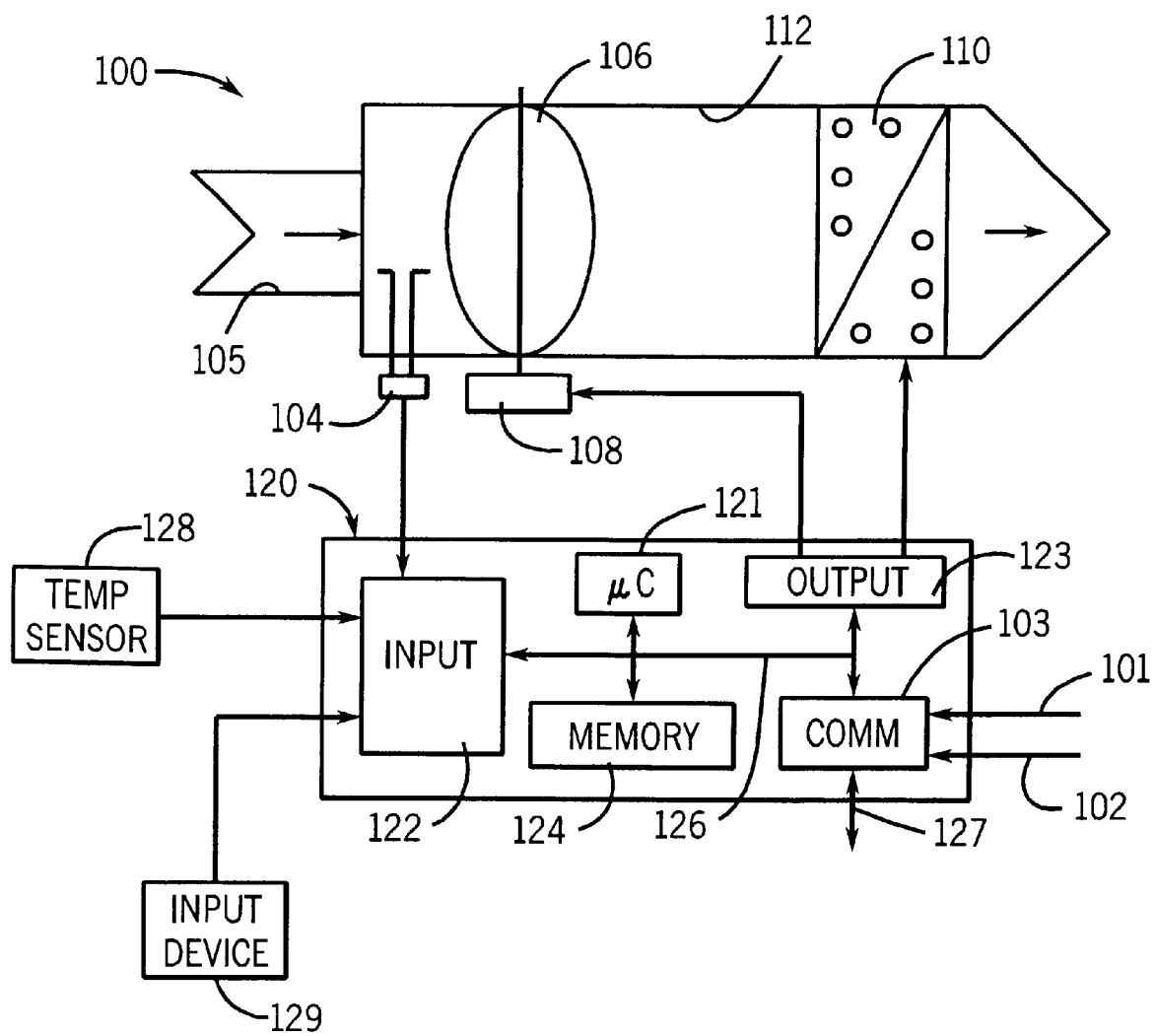
FIG. 1 is a block diagram illustrating a variable-air-volume terminal unit and its controller adapted in accordance with the present invention.

With reference to FIG. 1, a variable-air-volume (VAV) terminal unit, or box, 100 is designed to maintain a relatively constant supply air temperature and deliver a variable amount of conditioned air into a controlled region of a building to maintain the region at a desired temperature during its cooling mode of operation. It will be appreciated that the invention has application to other types of variable-air-volume apparatus. VAV terminal unit 100 is preferably an electro-mechanical device with a digital controller 120. The controller 120 is designed to control the quantity and rate of thermal energy which the VAV terminal unit discharges into the zone to meet the thermal loads of the zone.

Because the VAV terminal unit 100 has distributed digital control, it may operate in a standalone manner or may be coupled via a communication network through two ports 101 and 102 of a network interface 103 to a central control system for the entire building. When coupled to a network, VAV terminal unit 100 communicates using standard objects which reside within the digital controller 120. In this manner, the controller may retain "point" information which may be retrieved and viewed by a user at any user interface on the network.

The VAV terminal unit 100 has an air inlet 105 connected to a duct through which a supply air stream flows from a conventional air handling unit. The supply air has a nominal temperature of approximately 55° F.(13° C.). A damper 106, operated by an actuator 108, acts as a throttle for controlling the flow of supply air through VAV terminal unit. For example, the damper 106 may be adjusted to its minimum flow setting for ventilation if cooling is not required, and otherwise opened to a position that supplies the appropriate amount to cooled air to the building zone. When heat is needed, a box heating coil 110 is activated to warm the air flowing through chamber 112.

With continuing reference to FIG. 1, the damper actuator 108 and the heating coil 110 are operated by the VAV controller 120 which includes a microprocessor 121, input circuits 122, output circuits 123 and a memory 124 that are interconnected by signal buses 126. The input circuits 122 interface to input devices, such as parameter sensors, and the output circuits 123 interface to actuators in the VAV terminal unit 100. For example, one of those circuits 122 is connected to a temperature sensor 128 in the zone, while a another receives a differential pressure signal from a conventional flow sensor 104. An additional input is coupled to a user operable input device 129 which enables temperature and flow rate setpoints and other data to be entered into the controller 120. Separate setpoints for heating and cooling states of operation and for different time periods during the day can be defined. Alternatively such data may be entered from a laptop computer or similar device connected directly to the controller via a serial port 127. The setpoints and other operating parameters are stored in the memory 124.

The microprocessor 121 contains a control program stored in an internal read only memory for implementing a conventional control strategy based on the setpoints and inputs from the temperature and air flow sensors. The control program can employ any suitable control strategy, and preferably implements proportional-integral-derivative (PID) feedback control using the predictive adaptive control technology disclosed in commonly assigned U.S. Pat. Nos. 5,355,305; 5,506,768; 5,569,377; 5,768,121 and 5,875,109. The disclosures of these patents are hereby expressly incorporated herein by reference.

Thus control of the VAV terminal unit 100 is based in part on the measurement of the air flow provided by the sensor 104 and the accuracy of that measurement requires that the sensor be calibrated by defining the value of the gain factor k in Equation (2). While amplification of the differential pressure allows a lower resolution analog input, it creates other problems. Namely that the value of k is related to the Reynolds number of the flow stream, particularly for lower flow rates where the amplification is most desired. Thus the assumption of a constant value for k is not true. As noted by E. Ower and R. C. Pankhurst in *The Measurement of Air Flow*, 1977, Pergamon Press, Elmsford, N.Y., the gain factor may vary by up to five percent over typical air flow rate sensing ranges, thus adversely affecting the accuracy of the flow measurement. Therefore, to ensure that measurement of the air flow rate is accurate throughout the entire operating range of the VAV terminal unit 100, multiple calibration points are required. This is especially true for a sensor with a non-linear relationship between the magnitude of the air flow rate and its output signal.

In order to take advantage of the amplification properties of a sensor and yet provide highly accurate flow rate readings, the gain factor k is required to be calculated as a function of Reynolds number or one of its primary components. The Reynolds number $N_R$ is the ratio of the air's inertia forces to its viscous forces given by the expression:

$$N_R = \frac{D \cdot V \cdot \rho}{\mu} \quad (3)$$

where D is the diameter of the conduit, V is the flow velocity, and p is the fluid density, and $\mu$ is the fluid viscosity. The most sensitive variable, in Equation (3), for flow rate measurement is the flow velocity V because it is directly proportional to the flow rate. Therefore, the Reynolds number also is strongly coupled to differential pressure as both pitot tubes and orifice plates sense flow rate using differential pressure.

Thus it is reasonable to say that:

$$k = f(\Delta P) \quad (4)$$

where the functional relationship could be either linear or non-linear. For linear relationships, the dependent gain factor k can be expressed as a power series of the independent variable $\Delta P$ for the pressure differential, according to the equation:

$$k = a_0 + a_1 \cdot \Delta P + a_2 \cdot \Delta P^2 a_3 \cdot \Delta P^3 + \ldots + a_n \Delta P^n \quad (5)$$

If the number of calibration points exceeds the polynomial order by one then the coefficients $a_0$ through $a_n$ can be determined either analytically or numerically. If the number of calibration points exceeds the polynomial order by two or more, the coefficients can be determined via linear regression. If Equation (4) is non-linear then non-linear regression techniques may be required to determine the values of coefficients $a_0$ through $a_n$.

It is desirable in most HVAC air balancing applications to calibrate at both minimum and maximum air flow setpoints. The value of the minimum flow rate setpoint is determined by governmental building code requirements for ventilation and by output air diffuser performance. The value of the maximum air flow rate setpoint typically is based on noise generation criteria or to prevent terminal units closest to the fan from drawing to much air. Thus multiple point air flow sensor calibration is required.

Because the bandwidth and memory of the microprocessor 121 are minimal in the typical controller 120 used in variable air volume terminal units, a first order linear equation works very well for determining k as a function of the pressure differential, as shown by Equation (6).

$$k = a_0 + a_1 \cdot \Delta P \tag{6}$$

A first order relationship also guarantees that the flow rate measurement will exactly match a pair of calibration points at the minimum and maximum air flow setpoints.

Combining Equations (2) and (6) directly relates flow rate and differential pressure with two unknown coefficients $a_0$ and $a_1$ as given by the expression:

$$\dot{\omega} = C \cdot A \cdot \sqrt{\frac{\Delta P}{a_0 + a_1 * \Delta P}} \tag{7}$$

The controller 120 employs this equation to calculate the flow rate $\omega$ from the differential pressure $\Delta P$ indicated by the signal from sensor 104.

The values of coefficients $a_0$ and $a_1$ are determined using the two sets of calibration measurements for pressure differential $\Delta P$ and flow rate. The pair of calibration points give two equations with two unknowns as shown in Equations (8) and (9):

$$\dot{\omega}_1 = C \cdot A \cdot \sqrt{\frac{\Delta P_1}{a_0 + a_1 * \Delta P_1}} \tag{8}$$

$$\dot{\omega}_2 = C \cdot A \cdot \sqrt{\frac{\Delta P_2}{a_0 + a_1 * \Delta P_2}} \tag{9}$$

the subscript 1 refers to differential pressure and flow rate measurements at the minimum flow setpoint, and the subscript 2 refers to differential pressure and flow rate measurements at the maximum flow setpoint.

Solving Equations (8) and (9) for variables $a_0$ and $a_1$ yields:

$$a_1 = \frac{(C \cdot A)^2}{(\Delta P_2 - \Delta P_1)} \cdot \left( \frac{\Delta P_2}{\omega_2^2} - \frac{\Delta P_1}{\omega_1^2} \right) \tag{10}$$

$$a_0 = \Delta P_1 \cdot \left[ \left( \frac{C \cdot A}{\omega_1} \right)^2 - a_1 \right] \tag{11}$$

Figure 2:
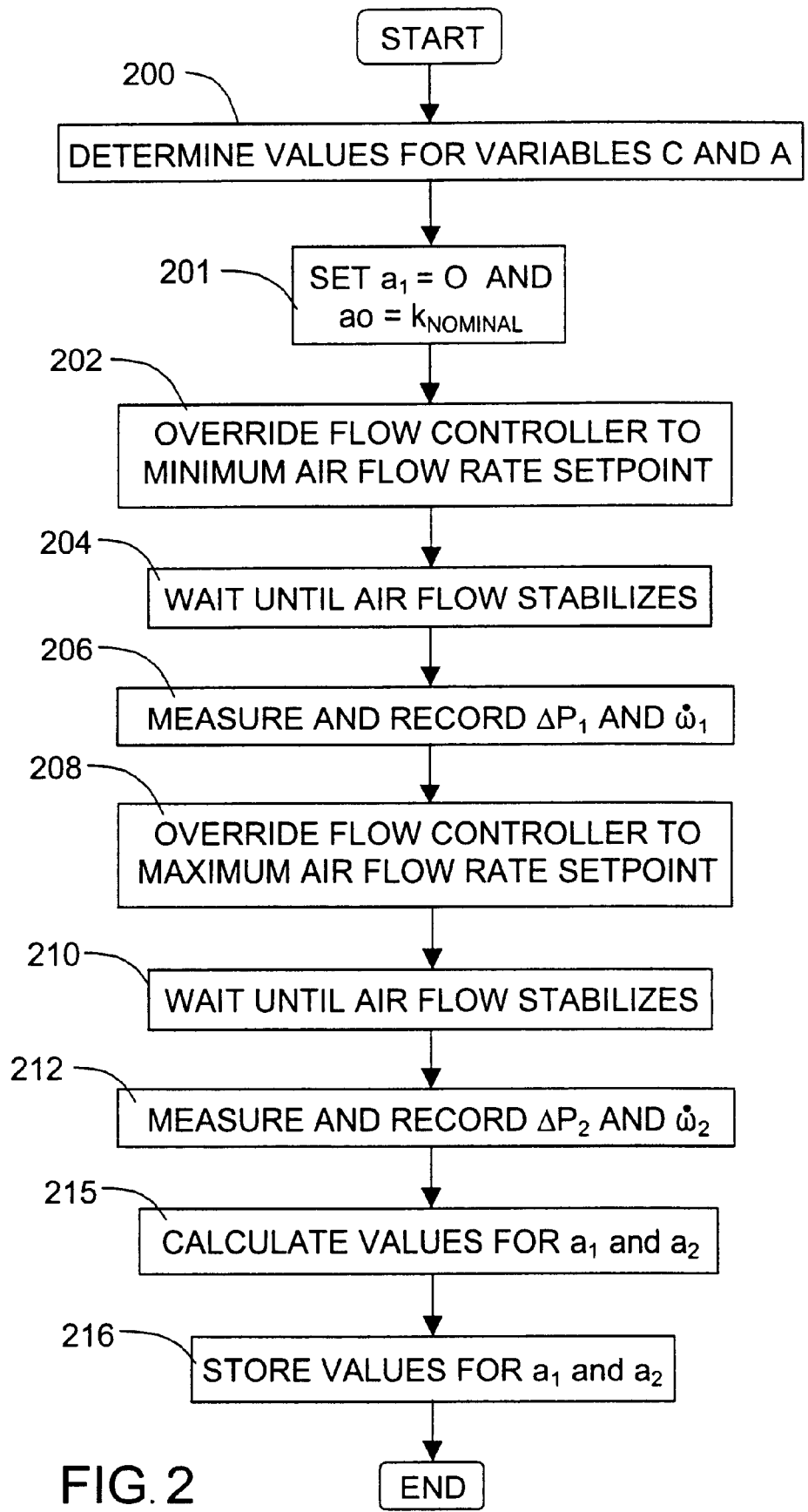
FIG. 2 is a flowchart of a process for calibrating the controller to measure the flow rate of air flowing through the variable-air-volume terminal unit.

To implement this two point calibration; the values for coefficients $a_0$ and $a_1$ are first determined using the procedure shown in FIG. 2 which is performed only once at calibration time. Initially at step 200, default values for the coefficient C and the cross-sectional area A of the VAV chamber 112 are determined. Then the coefficients $a_0$ and $a_1$ are set to default value, at step 201. Specifically $a_1$ is set to zero and $a_0$ is set equal to a default gain ($k_{nominal}$) provided by the manufacturer of the VAV terminal unit 100. Then, the controller is placed in a first override state of the calibration mode in which the damper 106 is placed into the minimum air flow position and the process waits for the air flow to stabilize at step 204. At step 206 the controller 120 then measures the differential pressure $\Delta P_1$ as detected by sensor 104 and the value is read from the controller 120 by the technician setting up the HVAC system. The technician also measures the actual air flow rate $\omega_1$ from the VAV terminal unit 100 by using a conventional air balancer hood placed over the outlet air diffuser in the room.

Next at step 208, the controller 120 is placed in a second override state of the calibration mode in which the damper 106 is placed into the maximum air flow position and the process waits for the air flow to stabilize at step 210. Thereafter at step 212, the technician reads the differential pressure $\Delta P_2$ from the controller 120 and measures the actual air flow rate $\omega_2$ by using the air balancer hood.

The technician enters these values into equations (10) and (11) and calculates values for the amplification coefficients $a_0$ and $a_1$ at step 215. Typically a laptop computer, palm top computer or similar device is used to perform the calculations. The calculated values are stored into the controller 120 at step 216 for use in solving equation (7) to derive the air flow rate from the pressure differential from sensor 104 during operation of the VAV terminal unit 100.

The advantages of this calibration procedure include: a perfect match between measured and calibration data at both minimum and maximum air flow rates and also the value of coefficient $a_0$ is typically close to the default gain ($k_{nominal}$) provided by the manufacturer of the VAV terminal unit.

Notice that the values of coefficient C and conduit's cross-sectional area A in Equations (8) and (9) are completely arbitrary when calibration data is used to obtain values for coefficients $a_0$ and $a_1$. This is self evident as both C and A cancel when the explicit definitions for $a_0$ and $a_1$ in Equations (10) and (11) are substituted into Equation (7). Thus if the product of variables C and A is set to one, Equations (10) and (11) can be further simplified as shown in Equations (12) and (13):

$$a_1 = \frac{1}{(\Delta P_2 - \Delta P_1)} \cdot \left( \frac{\Delta P_2}{\omega_2^2} - \frac{\Delta P_1}{\omega_1^2} \right) \tag{12}$$

$$a_0 = \Delta P_1 \cdot \left[ \left( \frac{1}{\omega_1} \right)^2 - a_1 \right] \tag{13}$$

With this assumption the calibration process is the same as in FIG. 2 with the elimination of step 200 and the use of Equations (12) and (13) in step 215. During operation of the VAV terminal unit 100 the controller 120 derives the flow rate $\omega$ from the sensed differential pressure $\Delta P$ according to the expression:

$$\dot{\omega} = \sqrt{\frac{\Delta P}{a_0 + a_1 * \Delta P}} \tag{14}$$

Eliminating coefficient C and conduit cross-sectional area A may seem trivial, but it is not. Recall that the value of coefficient C is primarily a function of air density which is strongly correlated to elevation, which varies geographically. Eliminating that coefficient means that the calibration procedure will automatically account for changes in air density. Furthermore, eliminating the cross-sectional area A of the fluid conduit means that it is no longer necessary to input an area measurement when the HVAC system is commissioned. The associated time savings can be substantial in installations for large buildings. Lastly, Equations (12) and (13) can be used uniformly regardless of whether the HVAC system utilizes the SI or IP system of units. The flow rate $\omega$ and pressure differential $\Delta P$ simply are measured and entered into the desired system of units into Equations (12) and (13). This procedure also ensures that the air flow measurement matches both the maximum and minimum air flow rate calibration points.

What is claimed is:

1. A method for calibrating an apparatus which measures an unknown flow rate of a fluid using a pressure sensor, said method comprising:

causing the fluid to flow past the pressure sensor at a first rate;

obtaining a first pressure reading from the pressure sensor;

measuring the flow of fluid with a flow rate meter to produce a first flow rate measurement;

causing the fluid to flow past the pressure sensor at a second rate;

obtaining a second pressure reading from the pressure sensor;

measuring the flow of fluid with a flow rate meter to produce a second flow rate measurement;

calculating a first gain factor coefficient $a_0$ from the first pressure reading, the second pressure reading, the first flow rate measurement and the second flow rate measurement; and calculating a second gain factor coefficient $a_1$ from the first pressure reading, the second pressure reading, the first flow rate measurement and the second flow rate measurement.

2. The method as recited in claim 1 wherein the first pressure reading and the second pressure reading are differential pressure readings.

3. The method as recited in claim 1 wherein the second gain factor coefficient $a_1$ is calculated according to the expression:

$$a_1 = \frac{(C \cdot A)^2}{(P_2 - P_1)} \cdot \left( \frac{P_2}{\dot{\omega}_2^2} - \frac{P_1}{\dot{\omega}_1^2} \right)$$

where C is a coefficient related to the fluid density, A is the cross-sectional area of a conduit through which the fluid is flowing, $P_1$ is the first pressure reading, $P_2$ is the second pressure reading, $\dot{\omega}_1$ is the first flow rate measurement, and $\dot{\omega}_2$ is the second flow rate measurement.

4. The method as recited in claim 3 wherein the first gain factor coefficient $a_0$ is calculated according the expression:

$$a_0 = P_1 \left[ \left( \frac{C \cdot A}{\dot{\omega}_1} \right)^2 - a_1 \right].$$

5. The method as recited in claim 1 wherein the second gain factor coefficient $a_1$ is calculated according to the expression:

$$a_1 = \frac{1}{(P_2 - P_1)} \cdot \left( \frac{P_2}{\dot{\omega}_2^2} - \frac{P_1}{\dot{\omega}_1^2} \right)$$

where $P_1$ is the first pressure reading, $P_2$ is the second pressure reading, $\dot{\omega}_1$ is the first flow rate measurement, and $\dot{\omega}_2$ is the second flow rate measurement.

6. The method as recited in claim 5 wherein the first gain factor coefficient $a_0$ is calculated according the expression:

$$a_o = P_1 \cdot \left[ \left( \frac{1}{\dot{\omega}_1} \right)^2 - a_1 \right].$$

7. The method as recited in claim 1 further comprising using the apparatus to determine an unknown flow rate of the fluid using the expression:

$$\dot{\omega} = Z \cdot \sqrt{\frac{\Delta P}{a_0 + a_1 * \Delta P}}$$

where Z has a predefined value, $\Delta P$ is a pressure differential derived from the pressure sensor.

8. The method as recited in claim 7 wherein Z equals one.

9. The method as recited in claim 7 wherein Z equals the product of a coefficient of fluid density and a cross-sectional area of a conduit through which the fluid is flowing.

10. A method for measuring a flow rate of a fluid using an apparatus having a pressure sensor, said method comprising:

calibrating the apparatus by:

(a) causing the fluid to flow past the pressure sensor at a first rate, (b) obtaining a first differential pressure reading $\Delta P_1$ from the pressure sensor, (c) measuring the flow of fluid with a flow rate meter to produce a first flow rate measurement $\dot{\omega}^1$, (d) causing the fluid to flow past the pressure sensor at a second rate, (e) obtaining a second differential pressure reading $\Delta P_2$ from the pressure sensor, measuring the flow of fluid with a flow rate meter to produce a second flow rate measurement $\dot{\omega}^2$, (f) calculating a first gain factor coefficient $a_0$ from the first pressure reading, the second pressure reading, the first flow rate measurement and the second flow rate measurement, and (g) calculating a second gain factor coefficient $a_1$ from the first pressure reading, the second pressure reading, the first flow rate measurement and the second flow rate measurement; and thereafter using the pressure sensor to measure a pressure differential $\Delta P$ as the fluid flows past the pressure sensor at the unknown flow rate;

producing a flow rate value $\dot{\omega}$ using the expression:

$$\dot{\omega} = Z \cdot \sqrt{\frac{\Delta P}{a_0 + a_1 * \Delta P}}$$

where Z has a predefined value.

11. The method as recited in claim 10 wherein the second gain factor coefficient $a_1$ is calculated according to the expression:

$$a_1 = \frac{Z}{(\Delta P_2 - \Delta P_1)} \cdot \left( \frac{\Delta P_2}{\dot{\omega}_2^2} - \frac{\Delta P_1}{\dot{\omega}_1^2} \right)$$

where $P_1$ is the first differential pressure reading, $P_2$ is the second differential pressure reading, $\dot{\omega}^1$ is the first flow rate measurement, and $\dot{\omega}^2$ is the second flow rate measurement.

12. The method as recited in claim 11 wherein the first gain factor coefficient $a_0$ is calculated according to the expression:

$$a_0 = \Delta P_1 \cdot \left[\left(\frac{Z}{\omega_1}\right)^2 - a_1\right].$$

13. The method as recited in claim 12 wherein Z equals one.

14. The method as recited in claim 12 wherein Z equals the product of a coefficient of fluid density and a cross-sectional area of a conduit through which the fluid is flowing.

15. A method for calibrating an apparatus which measures an unknown flow rate of a fluid using a pressure sensor, said method comprising:

causing the fluid to flow past the pressure sensor at a first rate;

obtaining a first pressure reading from the pressure sensor;

measuring the flow of fluid with a flow rate meter to produce a first flow rate measurement;

causing the fluid to flow past the pressure sensor at a second rate;

obtaining a second pressure reading from the pressure sensor;

measuring the flow of fluid with a flow rate meter to produce a second flow rate measurement;

deriving a first coefficient for a gain factor in response to the first pressure reading and the second pressure reading measured by the pressure sensor; and deriving a second coefficient for a gain factor in response to the first pressure reading and the second pressure reading.

16. The method as recited in claim 15 wherein the second gain factor coefficient $a_1$ is calculated according the expression:

$$a_1 = \frac{1}{(P_2 - P_1)} \cdot \left(\frac{P_2}{\omega_2^2} - \frac{P_1}{\omega_1^2}\right)$$

where $P_1$ is the first pressure reading at the first flow rate, $P_2$ is the second pressure reading at the second flow rate, $\omega_1$ is the first flow rate, and $\omega_2$ is the second flow rate.

17. The method as recited in claim 16 wherein the first gain factor coefficient $a_0$ is calculated according the expression:

$$a_o = P_1 \cdot \left[\left(\frac{1}{\omega_1}\right)^2 - a_1\right].$$

18. The method as recited in claim 15 wherein the first coefficient is derived in response to the first flow rate measurement.

19. The method as recited in claim 18 wherein the second coefficient is derived in response to the first flow rate measurement and the second flow rate measurement.

20. The method of claim 15 wherein the fluid is air used in an HVAC system.

* * * * *